US012381884B1

(12) United States Patent
Hess et al.

(10) Patent No.: US 12,381,884 B1
(45) Date of Patent: Aug. 5, 2025

(54) TIME-BASED CREDENTIAL VALIDITY PERIOD REDUCTION

(71) Applicant: Amazon Technologies, Inc., Seattle, WA (US)

(72) Inventors: Blake P Hess, Lake Forest Park, WA (US); Marcel Andrew Levy, Seattle, WA (US); Chandan Kundapur, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 369 days.

(21) Appl. No.: 17/937,394

(22) Filed: Sep. 30, 2022

(51) Int. Cl.
*H04L 9/40* (2022.01)

(52) U.S. Cl.
CPC .......... *H04L 63/108* (2013.01); *H04L 63/102* (2013.01); *H04L 63/20* (2013.01)

(58) Field of Classification Search
CPC ...... H04L 63/108; H04L 63/102; H04L 63/20
See application file for complete search history.

(56) References Cited

U.S. PATENT DOCUMENTS

| | | | |
|---|---|---|---|
| 7,707,406 B2 | 4/2010 | Qiu | |
| 9,923,927 B1* | 3/2018 | McClintock | ........ H04L 63/0846 |
| 2002/0046340 A1* | 4/2002 | Fujishiro | ................. H04L 9/006 |
| | | | 713/171 |
| 2002/0166049 A1* | 11/2002 | Sinn | .................... G06F 21/6218 |
| | | | 713/175 |
| 2002/0184444 A1* | 12/2002 | Shandony | ........... G06F 16/9574 |
| | | | 711/135 |
| 2003/0028495 A1* | 2/2003 | Pallante | ............... G06Q 20/341 |
| | | | 705/78 |
| 2005/0071630 A1* | 3/2005 | Thornton | ............... H04L 9/3226 |
| | | | 713/156 |
| 2010/0268942 A1* | 10/2010 | Hernandez-Ardieta | ..................... |
| | | | H04L 9/3268 |
| | | | 713/156 |

(Continued)

OTHER PUBLICATIONS

AWS. "AWS Certificate Manager User Guide Version 1.0", Retrieved from https://docs.aws.amazon.com/acm/latest/userguide/acm-ug.pdf#managed-renewal, Revised Jul. 14, 2021, pp. 1-137.

*Primary Examiner* — Olugbenga O Idowu
(74) *Attorney, Agent, or Firm* — Robert C. Kowert; Kowert, Hood, Munyon, Rankin & Goetzel, P.C.

(57) ABSTRACT

A credential management system with time-based credential validity period reduction is disclosed. The credential management system, responsive to determining to renew a current version of a time-based security credential, determines a validity time period length for a renewal version of the time-based security credential based on (1) a validity time period length for the current version of the time-based security credential and/or (2) renewal completion metrics for the respective credential holder. The credential management system obtains, from a credential authority, a renewed version of the time-based security credential having the determined validity time period length, and returns the renewed version to the credential holder. Receipt of the renewed version initiates performance of a deployment of the renewed credential at the respective credential holder to update use of the current version of the time-based security credential. Completion metrics are transmitted to the credential management system, for determining a next validity time.

20 Claims, 8 Drawing Sheets

(56) References Cited

U.S. PATENT DOCUMENTS

| | | | |
|---|---|---|---|
| 2011/0113239 A1* | 5/2011 | Fu | H04L 63/0823 |
| | | | 713/156 |
| 2011/0126001 A1* | 5/2011 | Fu | H04L 63/06 |
| | | | 713/156 |
| 2014/0136838 A1* | 5/2014 | Mossbarger | H04L 63/0823 |
| | | | 713/156 |
| 2016/0044023 A1* | 2/2016 | Barr | H04L 9/3268 |
| | | | 726/1 |
| 2017/0171191 A1* | 6/2017 | Cignetti | H04L 12/4625 |
| 2019/0044746 A1* | 2/2019 | Kang | H04L 12/282 |
| 2024/0089246 A1* | 3/2024 | Chen | H04J 3/0667 |

* cited by examiner

TIME-BASED CREDENTIAL VALIDITY PERIOD REDUCTION

BACKGROUND

Many companies and other organizations operate distributed systems that interconnect numerous computing systems and other computing resources to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities as businesses to provide computing resources to customers. As the scale and scope of typical distributed systems has increased, the tasks of securing, and managing the computing resources have become increasingly complicated. For example, some such systems require management of security features such as time-based credentials (e.g., x.509 certificates, session tokens, user role credentials, console credentials, biometrics, etc.).

Figure 1:
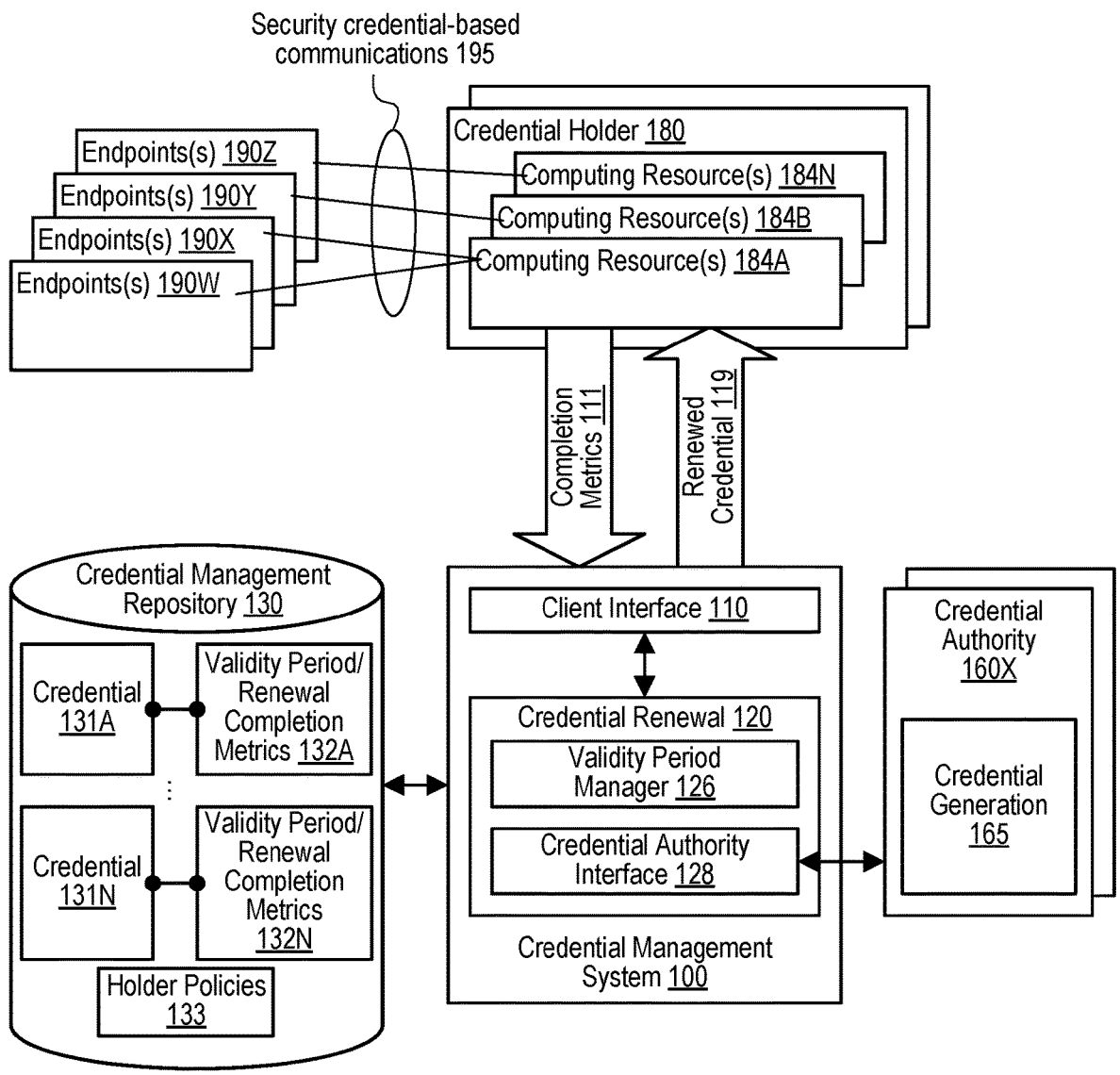
FIG. 1 illustrates an example system environment for server-side and/or customer-side features for time-based credential validity period reduction, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for a credential management system with automated, shortening of time-based credential validity periods are described.

In at least some embodiments, the time-based credential validity period reduction techniques described herein are an adaptive technique for successively reducing validity periods (e.g., in order to reduce a likelihood of security failures) and responsive to metrics that measure results of the reduction as feedback. In some instances, the techniques may be used to reduce credential validity periods that are over-estimated or are unnecessarily lengthy, while taking into account feedback such as pressures to lengthen the validity period (e.g., lengthier credential replacement time periods that make these security features easier to manage, etc.), for example.

In embodiments, validity periods and/or credential replacement completion metrics are received or otherwise obtained (e.g., from a credential holder system or from a credential management repository that stores validity period or replacement time information for respective credentials). A credential management system (e.g., operated by an enterprise or by a service provider for numerous credential holder customers) determines to renew a current version of a time-based security credential for a credential holder. For example, the credential management system may receive a renewal request from a customer or may initiate the renewal itself, based on a policy specified by a customer.

The credential management system determines a reduced validity time period length for a renewed version of the time-based security credential (e.g., based on a validity time period length for the current version of the time-based security credential, and/or the one or more renewal completion metrics for the respective credential holder) in some embodiments. The credential management system may also obtain, on behalf of the credential holder, the renewed version of the time-based security credential having the determined validity time period length (e.g., from a credential authority) and return the renewed version of the time-based security credential to the respective credential holder. In embodiments, receipt of the renewed version of the time-based security credential initiates performance of the renewal process at the respective credential holder to update use of (e.g., deploy) the current version of the time-based security credential to the renewed version of the time-based security credential.

Disclosed embodiments make use of various credential renewal completion metrics, at least some of which measure various characteristics of a credential deployment process at the customer credential holder resource. Some credential renewal completion metrics measure a length of time between receipt of, generation of, or issuance of, the renewal credential (e.g., by the management system or by the credential holder, or the like) and the time that the current version of the credential is replaced with the renewed version (e.g., at the resource that makes use of the credential). The completion metrics (e.g., measuring speed or success of the deployment) may measure characteristics for a particular credential, but the completion metrics may also be aggregated and measure characteristics across multiple or numerous credentials of a credential holder (e.g., for subsets of different types of credentials, in some embodiments). Example credential renewal completion metrics may include, but are not limited to: time taken to complete renewal(s) of a credential, percentage of nodes at a credential holder that have successfully completed credential renewals within a time threshold, number of previous consecutive renewal processes successfully completed within a time threshold for one or more credentials, or percentage of previous renewal processes successfully completed within a time threshold (e.g., for one or more credentials, or by type of credential, in some embodiments). In some embodiments, credential renewal completion metrics may include a notice from the credential holder system (e.g., a notice that a credential has been deployed to a resource, or the like)

Techniques and systems described herein may be applied to various different types of time-based credentials. A non-limiting list of example time-based credentials includes cryptographical credentials, service provider credentials (e.g., credentials for roles of a service provider service), secure session tokens, user interface credentials such as console credentials (e.g., for a service provider service management console), credentials used for single sign-on (SSO) use cases, client agent credentials such as tokens produced via biometric authentication, a public key certificate, a transport layer security (TLS) or secure socket layer (SSL) certificate, a code signing certificate, a client or personal ID certificate, etc.

One example of a time-based credential, a digital certificate, may represent a certification by a certificate authority of ownership of a public key by a named subject of the certificate. Certificates may be used for various wide-ranging purposes, such as in creation of secure connections or used in code signing applications, or to certify the identity of an individual (a client certificate) as non-limiting examples. When bound to a server or other network-accessible computing resource, the certificate may be used to create secure connections between the server and its clients, for example. In embodiments, a digital certificate may be obtained for each host, although it is contemplated that multiple hosts may share a digital certificate, in some embodiments. A digital certificate may have a validity period (associated with an expiration date) after which the certificate cannot be used (e.g., cannot be used to create secure connections). In embodiments, a certificate manager (e.g., of a certificate management service of a service provider) automatically renews certificates according to an automatic renewal date or other expiration-based schedule. For example, a credential manager may have automatically initiated renewal of a certificate shortly before the certificate was set to expire. Some examples provided herein refer to digital certificates, a type of credential. It is contemplated that the concepts in those examples may be applied to credentials, more generally.

As one skilled in the art will appreciate in light of this disclosure, embodiments may be capable of achieving certain improvements to computer technology, including some or all of the following technical effects: (1) facilitating shortening of credential validity periods, thereby improving security posture with shorter lived credentials (e.g., reducing compromised key events and key revocations), and (2) facilitating automation of credential renewals with shortened credential validity periods, thereby applying automation that reduces errors (e.g., manual credential renewals can be cumbersome and error prone) further improving the security posture with an automated process that reduces errors.

Attention is now drawn to the Figures, illustrating architectures of system components that perform functionality associated with processes for time-based credential validity period reduction. Generally, components illustrated in FIGS. 1, 2, 6, 7, and 8 may perform some of the functionality illustrated in FIGS. 3, 4, and 5A/5B. For example, the Credential Management System 100 may perform the functionality illustrated in FIGS. 3 and 4 (based on metrics from a Credential Holder 180 system, sometimes stored at a Credential Management Repository 130) and a Credential Holder 180 may perform the credential registration process in FIG. 5A and the credential deployment process illustrated in FIG. 5B. However, systems with more, fewer, or different components may perform some of the illustrated functionality, in the order depicted, or in a different sequence, in some embodiments.

FIG. 1 illustrates an example system environment for server-side and/or customer-side features for time-based credential validity period reduction, according to some embodiments. FIG. 1 illustrates Credential Holder 180 (in control of computing resource(s) 184A, 184B, 184N that make use of credentials from a credential authority, such as Credential Authority 160X), a Credential Management System 100, one or more components of which, may perform at least some of the functionality illustrated in FIGS. 3 and 4, for example. Generally, Credential Management System 100 may function to perform functionality associated with renewal of the credentials for the resources of one or more customers, such as Credential Holder 180. In some embodiments, the Credential Management System 100 may manage the lifecycles of private and/or public credentials on behalf of numerous Credential Holders 180.

In the illustrated embodiment, the Credential Management System 100 is a system that provides credential management services to a number of customers such as Credential Holder 180 and similar. In some embodiments (not illustrated) the Credential Management System 100 may part of a system or service of Credential Holder 180 (e.g., part of a credential holder network of systems or services). In some embodiments (not illustrated), the Credential Management System 100 may be implemented as part of Credential Authority 160X.

In some embodiments, Credential Holder 180 (e.g., a customer of the Credential Management System 100) may send renewal requests (not illustrated) to the Credential Management System 100. In some embodiments, the Credential Management System 100 determines when to initiate the renewal on behalf of the Credential Holder 180, according to a policy 133 specified by the Credential Holder 180, for example.

In embodiments, the Credential Holder 180 may represent one or more entities including a business entity, a developer, or administrator of the Computing Resource(s) 184A-184N. The Computing Resource(s) 184A-184N may represent a server, host, web server, application server, load balancer, containerized program, or another network-accessible or web-accessible computing entity, for example.

Non-exhaustive examples of a credential holder entity include an individual, a service provider, a group of resources, a network of different types of resources, etc. In embodiments, a given entity might be the holder for multiple different credentials and/or credential types. For example, a credential holder entity may be associated with or make use of a number of credentials and/or a number of different types of credentials. The Credential Management System 100 may track completion metrics for each of the credentials for an entity separately, in embodiments. In some embodiments, a credential holder may specify how to track the completion metrics in a policy specification 133 (e.g., as combined completion metrics across all credentials or subgroups of credentials or as separate completions metrics for each credential).

In the illustrated embodiment, the Validity Period/Renewal Completion Metrics 132A are stored to Credential Management Repository 130 associated with the Credential Management System 100. It is contemplated that the Validity Period/Renewal Completion Metrics 132A may be stored elsewhere, such as at a Credential Management Repository controlled by the credential holder (e.g., on the Credential Holder Network 182A) or the like. It is contemplated that the Credentials 131A, . . . 131N may be stored separate from the Validity Period/Renewal Completion Metrics 132A, . . . 132N at repositories controlled by the Credential Management System 100 or by the credential holder, for example.

In some embodiments, the Credential Holder 180 (e.g., an entity such as a user, a role, or administrator, or business entity, or the like) or a process operating on a credential holder resource or network may provide the completion metrics 111 to the Credential Management System 100. In some embodiments, the Credential Management System 100 may probe the resources of the credential holder to obtain or determine the Completion Metrics 111, and store them to a repository, for example.

FIG. 1 illustrates Endpoints 190W-190Z and Security-based communications 195 between the Endpoints and Computing Resource(s) 184A-N of Credential Holder 180. In one embodiment, in order to establish secure connections with clients using a secure protocol such as HTTPS, the Computing Resource(S) 184A-N may require a properly issued and up-to-date digital certificate (a type of credential) that is bound to the resource. In embodiments, the endpoints/clients that the credential holder communicates with checks whether the time-based credential has expired. In one embodiment, the digital certificate may be formatted according to the X.509 standard. The digital certificate may be issued by a Certificate Authority 160X that represents a trusted third party. The digital certificate may certify to clients of the resources 184A-N that a named subject of the certificate has ownership of a public key. The named subject may be an entity that offers the resource(s) 184A-N to clients, and the name may identify a business entity (e.g., a Credential Holder 180) that operates the resource. Clients of the resource(s) 184A-N may reply upon the signature or on assertions made about a private key that corresponds to the certified public key.

The digital certificate bound to the computing resource(s) 184A-N may have an expiration date. After the expiration date is reached, the certificate is deemed expired by clients of the resource and cannot be used to create secure connections.

Credential Holder 180 may initiate a renewal of the certificate by sending a renewal request to the Credential Management System 100. The Credential Management System 100 may provide a Client Interface 110 that receives such requests. The Client Interface 110 may permit a client (e.g., an administrator interacting with the Client Interface via a resource of the credential holder), on behalf of the Credential Holder 180 to request that the Credential Management System 100 perform one or more operations (e.g., as associated with credential renewal). In one embodiment, the Client Interface 110 may represent one or more application programming interfaces (APIs). In one embodiment, the client interface 110 may represent a command-line interface (CLI). In one embodiment, the client interface 110 may represent a console or other graphical user interface (GUI) that can be displayed on a display device associated with a client or resource of resource(s) 184A-N. The console may be built on the one or more APIs. For example, to submit a renewal request, a user may push a "certificate renewal" button or select a similar interface element in a graphical user interface provided by the Credential Management System 100. The renewal request may include a certificate identifier of the digital certificate to be renewed. The renewal request may include or be associated with credentials of the requesting user (e.g., an admin).

In various embodiments, a Certificate Authority (a type of Credential Authority 160X) may be part of the Credential Management System 100 or external to the Credential Management System 100. Based (at least in part) on the signing request and other data received with the request, the Certificate Authority may verify the identity of the requesting entity and perform signed certificate generation (a type of Credential Generation 165) to sign a renewed certificate (a type of a credential 119). The renewed certificate may be associated with a new expiration date. The renewed certificate may be associated with a domain name, server name, and/or identity of the certificate owner, in examples.

Via the Credential Authority Interface 128, the Credential Management System 100 may receive the renewed certificate (a type of credential 119) from the certificate authority. The renewed certificate may be stored indefinitely by the Credential Management System 100 (e.g., at the Credential Management Repository). The renewed certificate may be stored with a new automatic renewal date that replaces the earlier automatic renewal date, e.g., in a repository of certificates maintained by the Credential Management System 100. Via the Client Interface 110, the Credential Management System 100 may provide the renewed certificate to the Credential Holder 180. In one embodiment, the Credential Holder 180 may use an API or other programmatic interface to request the status of the certificate and/or its renewal, and a response to that status request by the Credential Management System 100 may indicate whether the renewal succeeded or failed (an example of a Renewal Completion Metric 132A). The status of the renewal and/or details of the renewed certificate may be presented in a console or other GUI associated with the Credential Management System 100. The Credential Holder 180 may export the renewed certificate from the Credential Management System 100, e.g., using the Client Interface 110. The Credential Holder 180 may bind the renewed certificate to the computing resource 184A to enable clients of that resource to establish secure connections using the new key pair associated with the renewed certificate, in the illustrated example.

Figure 2:
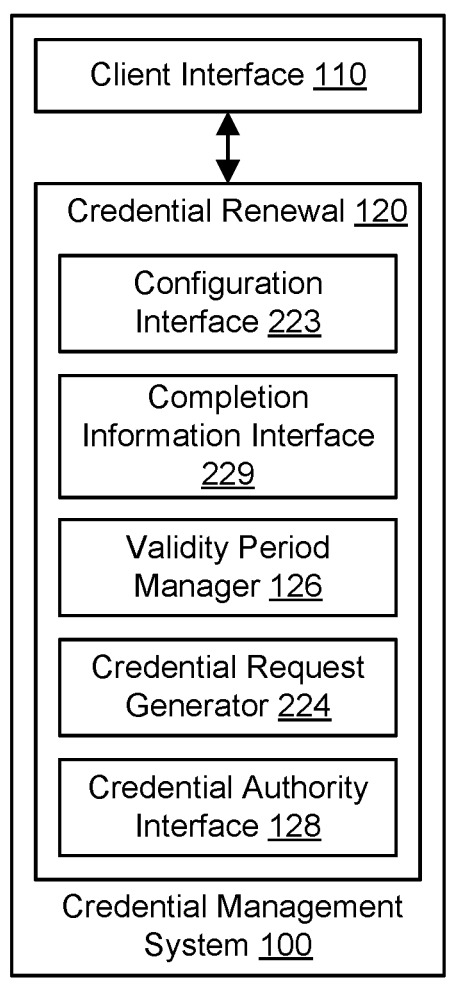
FIG. 2 illustrates example components of a Credential Management System that facilitates server-side and/or customer-side features for time-based credential validity period reduction, according to some embodiments.
Figure 3:
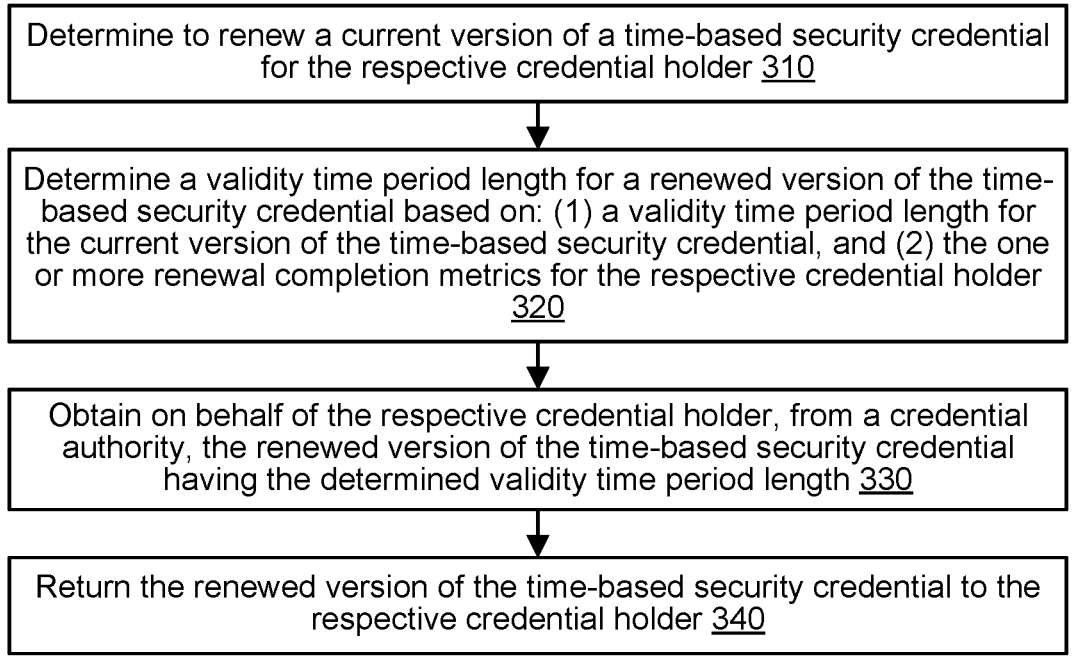
FIG. 3 illustrates a process diagram for server-side features for time-based credential validity period reduction, according to some embodiments.

FIG. 2, related in FIG. 1, illustrates example components of a Credential Management System that facilitates server-side and/or customer-side features for time-based credential validity period reduction, according to some embodiments. FIG. 3, related to FIGS. 1 and 2, illustrates a process diagram for server-side features for time-based credential validity period reduction, performed by one or more components of the Credential Management System illustrated in FIG. 2, according to some embodiments.

For example, one or more components of Credential Management System 100 (additional example components of which are illustrated in FIG. 2) may determine (or may receive a request from the Credential Holder 180) to renew a current version of a time-based security credential for a credential holder (e.g., as illustrated in FIG. 3 at block 310). For example, the request from the Credential Holder 180 may be received via the Client Interface 110 (illustrated in FIG. 2) of the Credential Management System 100. The Validity Period Manager 126 may determine a validity time period length for a renewed version of the time-based security credential (FIG. 3, block 320). For example, the time period length may be determined based on a validity time period length for the current version of the time-based security credential, and/or various metrics such as, but not limited to, renewal completion metrics for the credential holder.

In embodiments, the metrics may be pushed to the Credential Management System 100, by a process of the Credential Holder 180 (via a Completion Information Interface 229, such as an API, CLI, GUI or other interface) or may be pulled by the Credential Management System 100. In embodiments, the time period length may be a modification to the validity time period length for the current version of the time-based security credential, or may be a time period length specified in a policy from the credential holder for renewals based on requirements irrespective of the current time period length (a policy may be specified via Configuration Interface 223, for example).

In some embodiments, the Credential Management System 100 may generate a credential request specifying the determined (e.g., shortened) validity period (e.g., via Credential Request Generator 224), and obtain the renewed version of the time-based security credential having the determined validity time period length on behalf of the Credential Holder 180 from a Credential Authority 160X (e.g., via Credential Authority Interface 128), and return the renewed version of the time-based security credential (Renewed Credential 119) to the Credential Holder 180. In embodiments, it is contemplated that the Credential Management System 100 may manage credentials as described herein for many distinct customers (and/or different credential holders) using more than one Credential Authority. FIG. 1 illustrates that Credential Authority 160X has a Credential Generation component 165 (e.g., a digital token, user credential, or certificate generation process, or the like).

In embodiments, the Credential Holder 180 deploys the renewal credential to a resource on the credential holder network, and reports Completion Metrics 111 back via the Completion Information Interface 229. A non-exhaustive list of example renewal completion metrics include time taken to successfully complete the renewal (for one or more credentials), percentage of nodes (a resource type) or a percentage of a subset of types of nodes, at the credential holder, that successfully completed renewals within a time threshold, number of previous consecutive renewal processes successfully completed within a time threshold (for a single credential or for a group of credentials), and/or percentage of previous renewal processes successfully completed within a time threshold (for a single credential or for a group of credentials).

Figure 4:
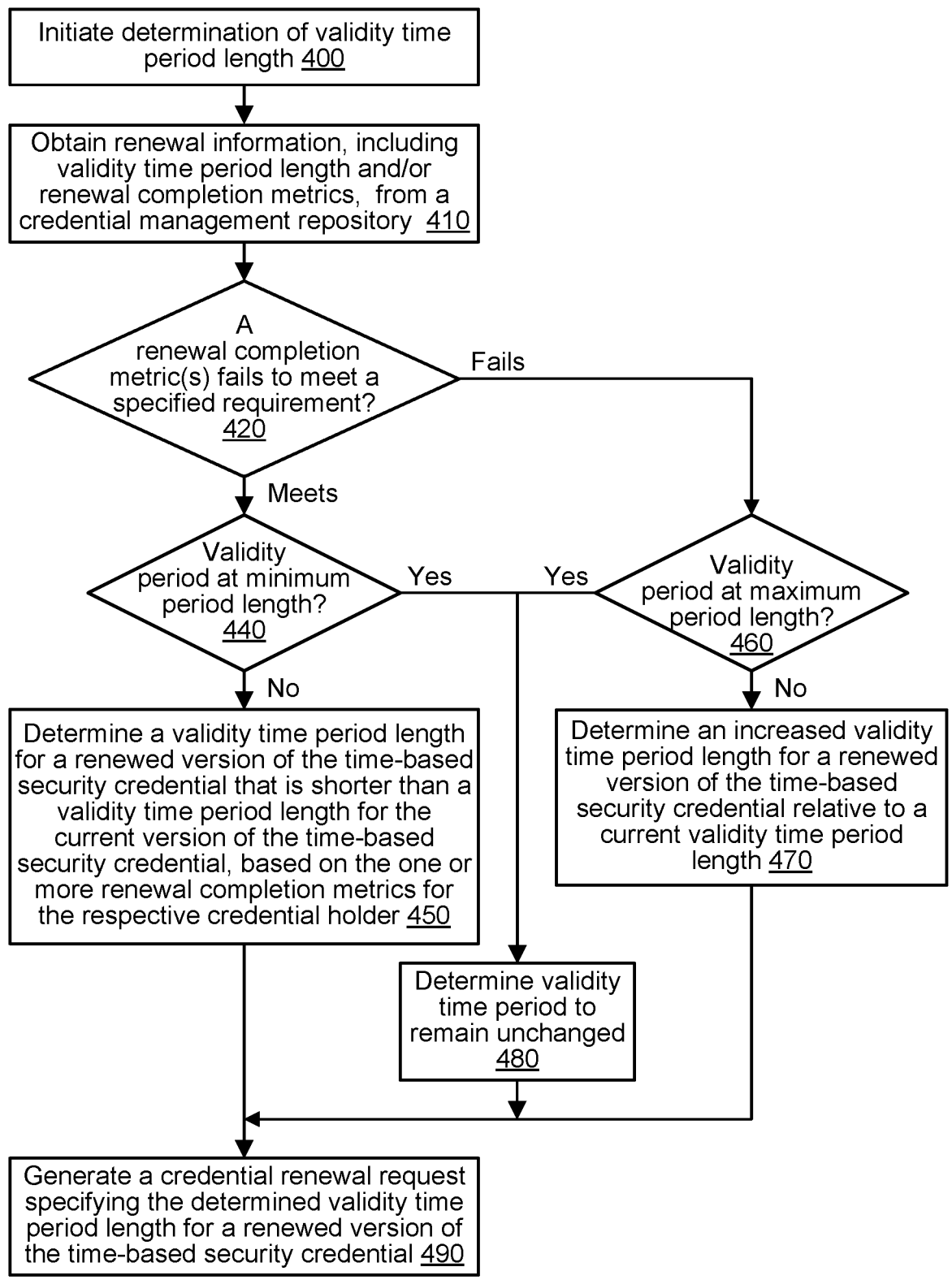
FIG. 4 illustrates a process diagram for additional server-side features for time-based credential validity period reduction, according to some embodiments.

FIG. 4 illustrates a process diagram for additional server-side features for time-based credential validity period reduction, according to some embodiments. The illustrated process may be performed by one or more components of the Credential Management System 100, such as by the Validity Period Manager 126, for example. In embodiments, the process begins with initiation of the determination of a length of a validity time period for a credential (block 400). The process may be initiated responsive to a renewal request from a credential holder or based on logic internal to the Validity Period Manager 126 (e.g., based on configurable parameters specified in a policy specified by the credential holder).

At block 410, renewal information, including validity time period length and/or renewal completion metrics are obtained (e.g., from a Credential Management Repository 130 or from a Credential Holder 180). In embodiments, the renewal completion metrics indicate, or may be used to determine, a speed of the replacement of the credential at the resource (e.g., how long it took to replace a credential after each new credential was issued), the number of replacements made successfully, the number of replacements made successfully in a series of shorter time windows) for the completed renewal(s). At block 420, the Validity Period Manager may determine whether a renewal completion metric fails to meet a specified requirement in a policy from the credential holder (e.g., requirements may be specified by a credential holder via Configuration Interface 223 or may be system defaults of the Credential Management System 100).

In some embodiments, the Credential Management System 100 may monitor the renewal completion metrics 132A-132N to determine whether performance of a renewal process at the respective credential holder to update use of the current version of the time-based security credential to the renewed version of the time-based security credential is competed within a threshold time period. In some embodiments, the Credential Management System 100 may proactively (e.g., without or absent a request from a Credential Holder 180) request a new renewed time-based security credential from the Credential Authority having a different validity time period length than the current time-based security credential. For example, the Credential Management System 100 may initiate request of a new, renewed time-based credential, based on analysis of an amount of time before the current time-based credential expires, and/or based upon information in the Renewal Completion Metrics 132A that indicates the speed at which the current and/or previous instances of the credential, once obtained, were deployed. In embodiments, proactively requesting the new renewed time-based security credential may include revoking the renewed time-based security credential.

In embodiments, the process of determining the length of the validity time period may be performed asynchronously from the process of generating the request for the credential and obtaining the credential from the Credential Authority 160X. For example, monitoring of the Renewal Completion Metrics 132A may result in initiation of the process of determining the length of the validity time period and the determined length may be stored for later use (e.g., to Credential Management Repository 130 or elsewhere). The credential request generation process may be initiated later (e.g., in response to a request from the Credential Holder 180, or based upon an approaching expiration date for the credential, as non-limiting examples).

In some embodiments, the Credential Management System 100 may transmit (e.g., via Completion Information Interface 229) requests to one or more resources or services at the respective Credential Holder 180 using the time-based security credential, to verify completion of the renewal process at the respective credential holder. The Credential Management System may update (via the Completion Information Interface 229) the renewal completion metrics for the resources or services based on responses to the transmitted requests, in embodiments.

Example requirements include, but are not limited to, a requirement for the one or more metrics indicating when to shorten the length of the validity time period, a requirement for the one or more metrics indicating when to increase the length of the validity time period, a minimum length (minimum period could be based on a Credential Authority 160X ability to service renewal requests, or a Credential Authority-defined minimum), a maximum length, and a requirement for the one or more metrics indicating when to proactively initiate a new renewal if a new renewal is not complete. In embodiments, the requirements may be configurable via Configuration Interface 223 (e.g., an API, CLI, GUI, etc.) by a credential holder, for example.

In embodiments, if metrics or other information indicate the renewal completion failed, the Validity Period Manager may set the validity time period back to a longer validity time period or back to a maximum default validity period (e.g., a year) or whatever the configurable maximum validity period duration has been set to (e.g., by the credential holder, or by an admin., etc.).

In embodiments, if renewal completion metrics, or some other information, indicate a likely manual replacement process, the length of the validity time period may be reduced by smaller amount than normal (than for an automated replacement process).

In embodiments, if the completion metrics or other information indicate that the credential deployment process happened close to expiration of the current credential (closeness may be configurable, by an admin or credential holder, via Configuration Interface 223), the Validity Period Manager 126 may include logic to lengthen the validity time period or reduce the time period by a smaller amount than otherwise.

In embodiments, the Validity Period Manager 126 may include logic to add length to the selected or current validity period if the metrics indicate unsuccessful renewals or if a credential expired, for example.

FIG. 4 illustrates that if a renewal completion metric fails to meet a specified requirement (block 420, Fails) the Validity Period Manager 126 may, for a validity period that is not at a maximum period length (block 460, no), determine an increased validity time period length for a renewed version of the time-based security credential relative to a current validity time period length (block 470). If a renewal completion metric(s) successfully meets a specified requirement (block 420, Meets) the Validity Period Manager 126 may, for a validity period that is not at a minimum period length (block 440, no) determine a validity time period length for a renewed version of the time-based security credential that is shorter than a validity time period length for the current version of the time-based security credential, based on the one or more renewal completion metrics for the respective credential holder (block 440). If the validity period is either at a minimum period length (block 440, yes) or at a maximum period length (block 460, yes) the time period may be left alone-neither increased nor decreased (block 480).

If the metric is associated with one or more resources of a fleet of resources, the Validity Period Manager 126 may select a period that spreads expiration times widely to avoid failure across the fleet occurring close in time. Similarly, the Validity Period Manager 126 may specify, in the request to the Credential Authority, to add jitter (e.g., the Credential Authority provides a 30-day validity time period, plus or minus 7 days). In some embodiments, for example in cases of a fleet of hosts with many credentials, the Validity Period Manager 126 may use statistical analysis of renewal completion performance across numerous credentials to select validity time period length.

At block 490, a certificate renewal request is generated specifying the determined validity time period length for a renewed version of the time-based security credential (e.g., and then sent to a credential authority 160X).

Figure 5A:
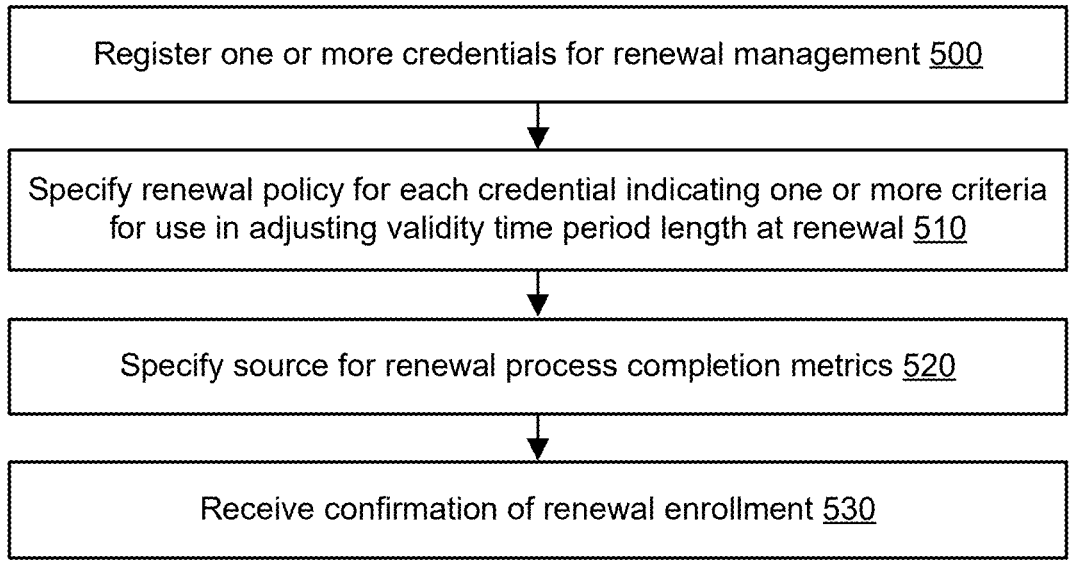
FIGS. 5A/5B illustrate process diagrams for customer-side features for time-based credential validity period reduction, according to some embodiments.

FIGS. 5A/5B illustrate process diagrams for customer-side features for time-based credential validity period reduction, according to some embodiments. The functionality illustrated in FIGS. 5A/5B may be performed by a Credential Holder entity 180. For example, some portion, or all of the functionality may be performed manually (e.g., by an admin via client 170, illustrated in FIG. 6, described below) while some portion, or all of the functionality may be performed by logic (e.g., a Credential Deployment Processor 720) executing on the Credential Holder Network 182A, illustrated in FIG. 7, described below.

FIG. 5A, illustrating a credential registration process, illustrates that one or more credentials are registered (with the Credential Management Service 100) for renewal management (e.g., via Client Interface 110 or similar). At block 510 a renewal policy for each credential is specified, indicating one or more criteria for use in adjusting validity time period length at renewal. A source for renewal process completion metrics is specified (block 520). For example, an endpoint on the credential holder network may be specified. Confirmation of renewal enrollment for the credentials is received (block 530).

In some embodiments, a renewal policy is sent to a Credential Management System 100, wherein one or more renewal policies (e.g., Holder Policies 133, illustrated in FIG. 6, described below) specifies the criteria used to determine when to the increase or decrease the length, and/or how fast to increase or decrease, and/or the minimum/maximum lengths, etc. In embodiments, the holder renewal policy 133 is a policy specified by the Credential Holder 180 and may specify other features, such as configuration parameters, other requirements (e.g., the requirements described in FIG. 4, described above), etc. In embodiments, determination of the validity time period is based on the criteria specified in the renewal policy from the respective credential holder. Examples of criteria include a requirement for the one or more metrics indicating when to shorten length, a requirement for the one or more metrics indicating when to increase length, minimum length, or maximum length, and a requirement for the one or more metrics indicating when to proactively initiate a new renewal if a new renewal not complete.

In embodiments, a processor (e.g., Credential Deployment Processor 720) of a Credential Holder 180 may determine when to renew and send a renewal request to the credential management system. In some embodiments, the Credential Management System 100 may make the determination (based on the renewal policy 133).

It is contemplated that an entity with privileges (e.g., an administrator) at the Credential Management System 100 operator (e.g., an enterprise or Multi-Tenant Provider Network 390, etc.) may configure the policy, in some embodiments, specifying requirements, minimums, maximums, defaults, other criteria, etc.

Figure 7:
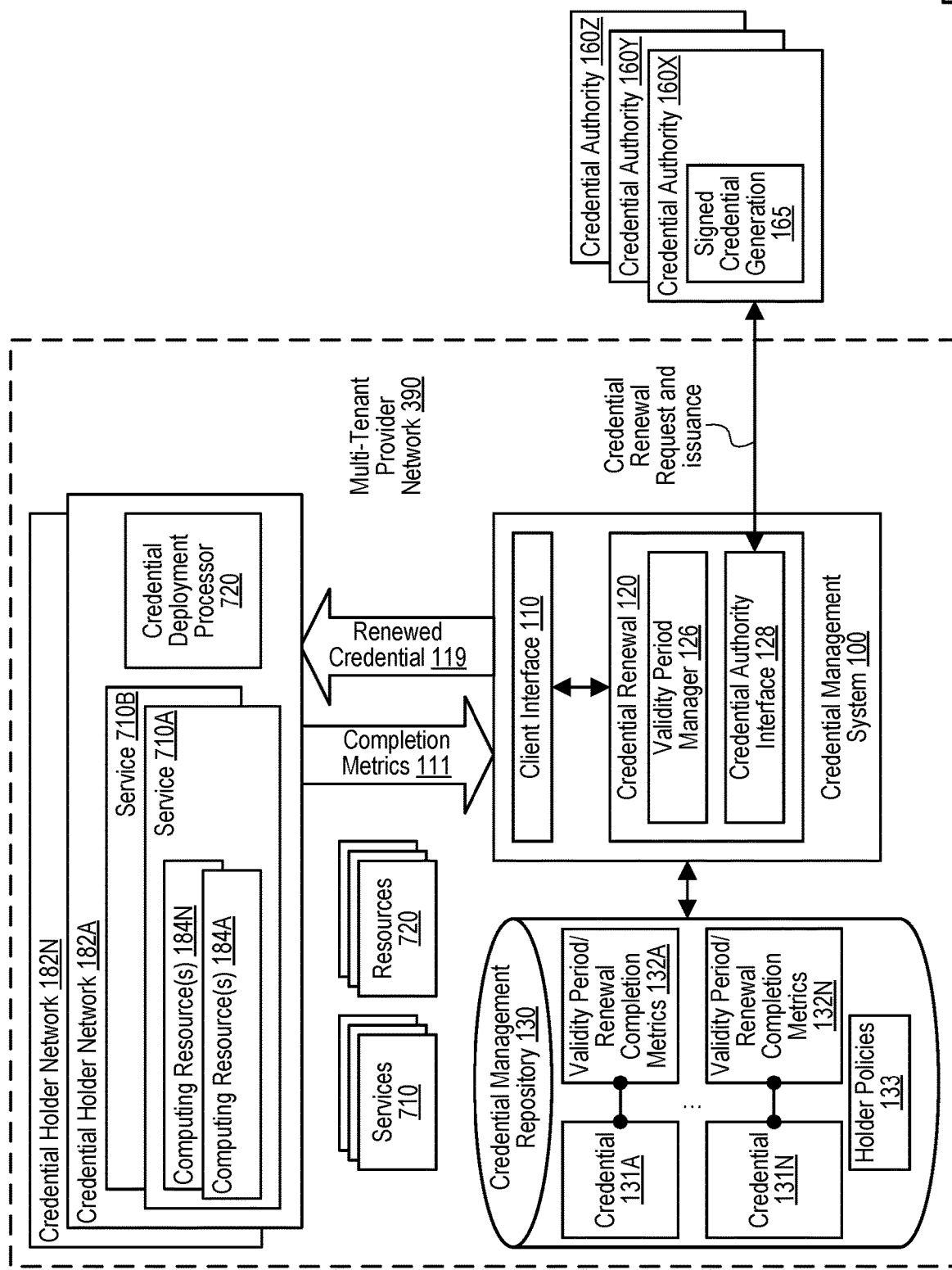
FIG. 7 illustrates an example system environment for server-side and/or customer-side features for time-based credential validity period reduction, according to some embodiments.

In some embodiments, where at least some of the credentials are digital certificates, a determination of when to renew is made for different subsets of resources using different certificates (e.g., as illustrated in FIG. 7, described below), the different certificates having different time periods. The Credential Management System 100 may send respective renewal requests for each subset to the credential management system, in embodiments.

Figure 5B:
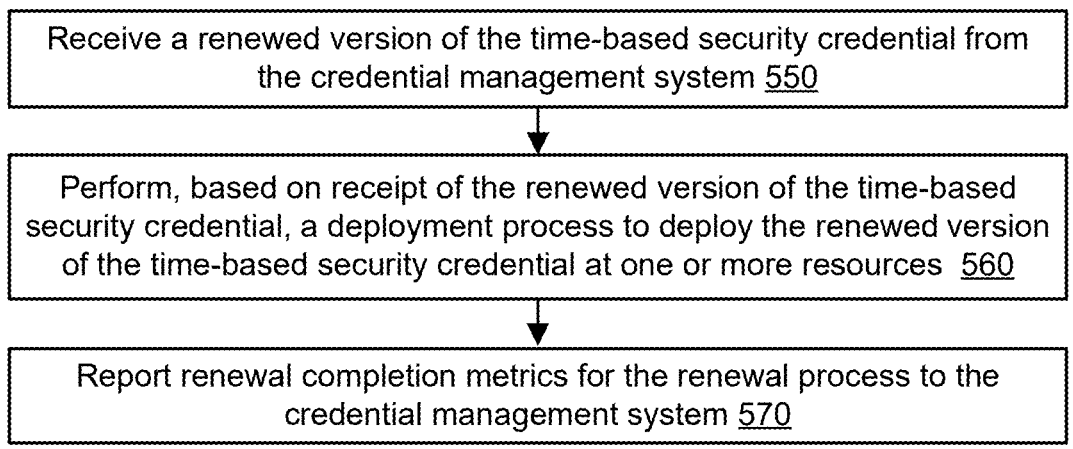

FIG. 5B illustrates, at block 550, that a renewed version of the time-based security credential is received from the Credential Management System 100 (e.g., via Client Interface 110) and a deployment process to deploy the renewed version of the time-based security credential at one or more resources is performed, based on receipt of the renewed version of the time-based security credential (block 560). Block 570 illustrates reporting (e.g., by a Credential Deployment Processor 720 of the Credential Holder) the renewal completion metrics for the renewal process to the Credential Management System 100.

Figure 6:
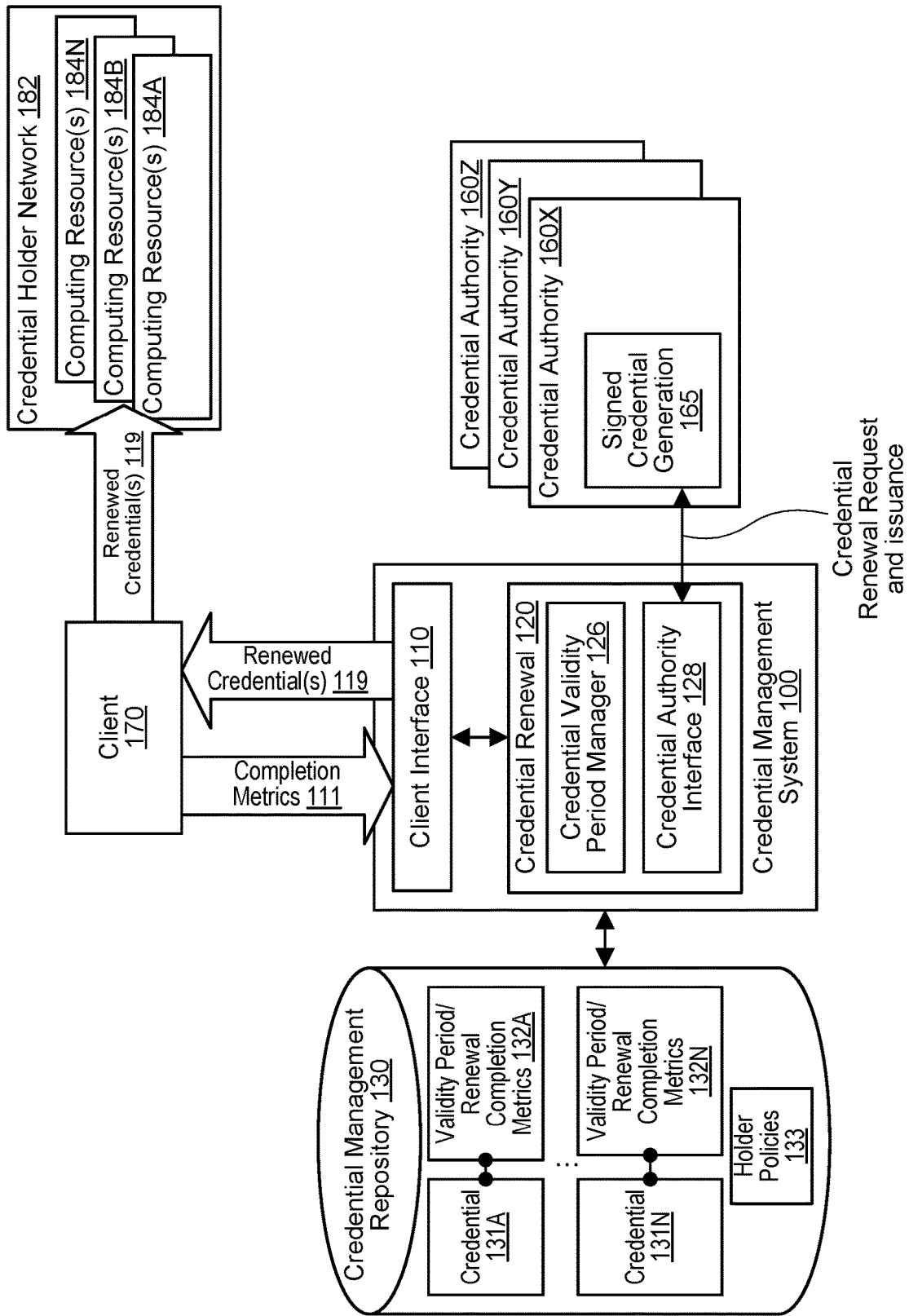
FIG. 6 illustrates an example system environment for server-side and/or customer-side features for time-based credential validity period reduction, according to some embodiments.

FIG. 6. illustrates Credential Holder Networks 182A, . . . 182N and Computing Resource(s) 184A, 184B, . . . 184N. In some embodiments, Computing Resources 184 may be various different types of computer resources such as compute instances or storage. In some embodiments, Computing Resources 184 may be various types of services, such as services hosted by a multi-tenant service provider (e.g., a web-hosting service or similar) that may include network endpoints that are associated with credentials such as digital certificates or the like.

FIG. 6 illustrates an example system environment for server-side and/or customer-side features for time-based credential validity period reduction, according to some embodiments. In the illustrated embodiment, a Client 170 on Credential Holder Network 182 is used by an administrator on behalf of the Credential Holder 180 to receive the Renewed Credential(s) 119 and to deploy the Renewed Credential(s) 119 to the appropriate Computing Resource of the Computing Resource(s) 184A-184N of Credential Holder Network 182. The Client 170 may also be used by the administrator to report the Completion Metrics 111 associated with the Renewed Credential(s) 119. FIG. 6 also illustrates Holder Policies 133, stored to Credential Management Repository 130 (the Holder Policies may be stored elsewhere, away from the completion metrics 132A-N, in some embodiments).

FIG. 7 illustrates an example system environment for server-side and/or customer-side features for time-based credential validity period reduction, according to some embodiments. In the illustrated embodiment, the Credential Management System 100 is implemented in a network-based, multi-tenant provider network 390. The network-based, multi-tenant provider network 390 is illustrated as providing various network-based Services 710, and Resources 720 such as storage and compute resources. In embodiments, the renewed version of the time-based security credential is for a resource of the network-based, multi-tenant provider network.

In embodiments, services 710 that are credential holders can be hosted in compute and/or storage services of the provider network. Also credential holders can be external to the provider network and still utilize the Credential Management System of the provider network 390. In embodiments, the Credential Management System 100 is another service offered by the service provider network 390. In embodiments, one or more Credential Authorities may be one of the services in the provider network 390 (not illustrated).

FIG. 7 illustrates Credential Holder Network 182A and 182N. Credential Holder Network 182A is illustrated with Services 710A and 710B (e.g., services of a multi-tenant service provider or other type of network-based services) that include Computing Resource(s) 184A-184N. In embodiments, the Computing Resources generate and respond to security credential-based communications 195 with Endpoint(s) 190W, 190X, 190Z, etc. illustrated in FIG. 1. In some embodiments, each of the Service(s) 710A and 710B may be distinct holders of credentials for the entity controlling the Credential Holder Network 182A. In FIG. 7, a Credential Deployment Processor 720 (an executing computer process) may receive Renewed Credentials 119, deploy the Renewed Credentials to the appropriate resource and report Completion Metrics 111 back to the Credential Management System 100.

Illustrative Computer System

Figure 8:
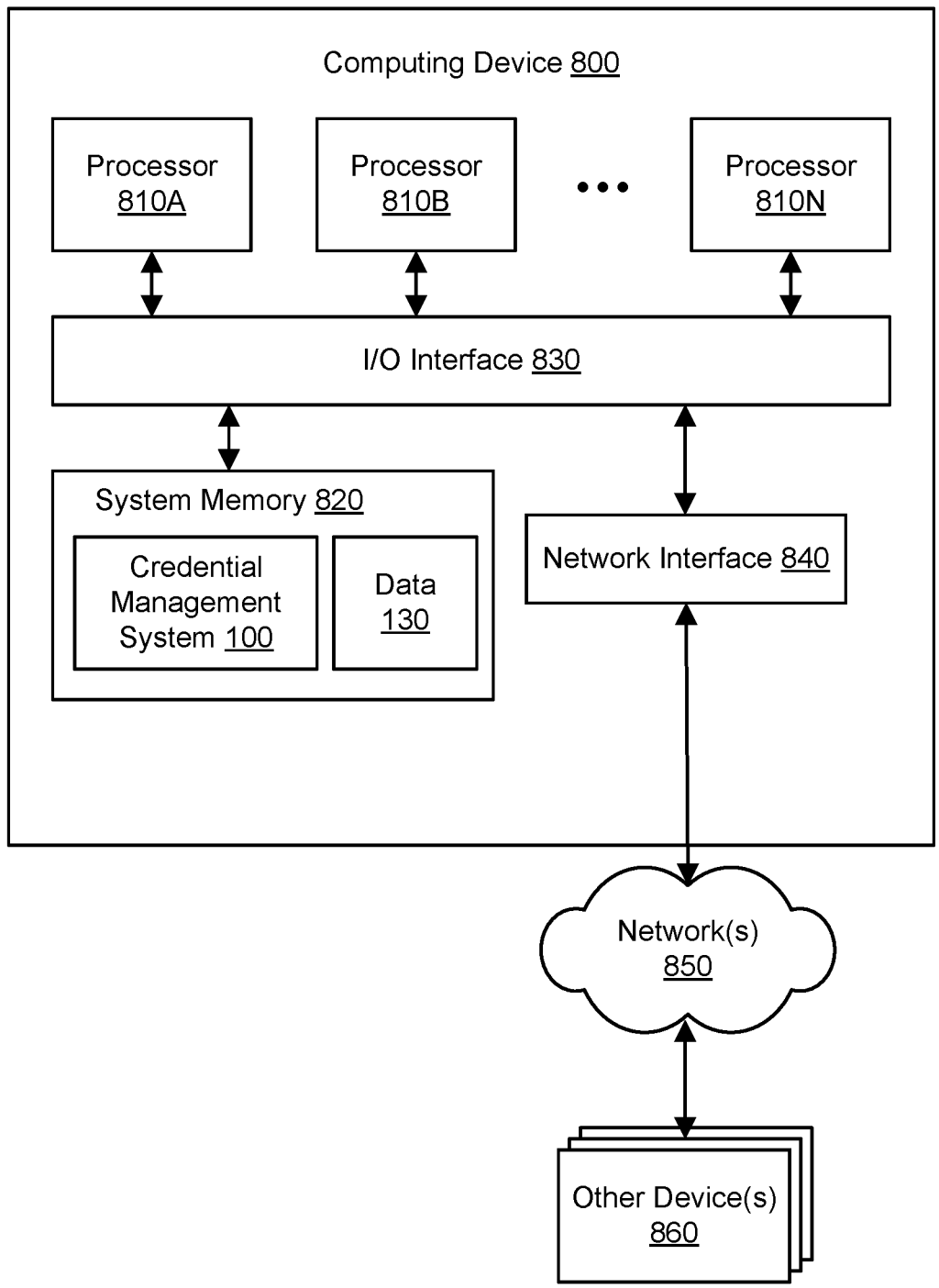
FIG. 8 illustrates an example computing device that may be used in some embodiments.

In at least some embodiments, a computer system that implements a portion or all of one or more of the technologies described herein (server-side or customer-side features for time-based credential validity period reduction) may include a computer system that includes or is configured to access one or more computer-readable media. FIG. 8 illustrates such a computing device 800, according to some embodiments. In the illustrated embodiment, computing device 800 includes one or more processors 810A-810N coupled to a system memory 820 via an input/output (I/O) interface 830. In one embodiment, computing device 800 further includes a network interface 840 coupled to I/O interface 830.

In various embodiments, computing device 800 may be a uniprocessor system including one processor or a multiprocessor system including several processors 810A-810N (e.g., two, four, eight, or another suitable number). In one embodiment, processors 810A-810N may include any suitable processors capable of executing instructions. For example, in various embodiments, processors 810A-810N may be processors implementing any of a variety of instruction set architectures (ISAs), such as the x86, PowerPC, SPARC, or MIPS ISAs, or any other suitable ISA. In one embodiment, in multiprocessor systems, each of processors 810A-810N may commonly, but not necessarily, implement the same ISA.

In one embodiment, system memory 820 may be configured to store program instructions and data accessible by processor(s) 810A-810N. In various embodiments, system memory 820 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 820 as code (i.e., program instructions) for server-side or customer-side features for time-based credential validity period reduction 825 and corresponding data 826 (e.g., Validity Period/Renewal Completion Metrics). In one embodiment, the memory 820 may store program instructions for implementing at least some aspects of the Credential Management system 100.

In one embodiment, I/O interface 830 may be configured to coordinate I/O traffic between processors 810A-810N, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processors 810A-810N). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. In some embodiments, some or all of the functionality of I/O interface 830, such as an interface to system memory 820, may be incorporated directly into processors 810A-810N.

In one embodiment, network interface 840 may be configured to allow data to be exchanged between computing device 800 and other devices 860 attached to a network or networks 850. In various embodiments, network interface 840 may support communication via any suitable wired or wireless general data networks, such as types of Ethernet network, for example. Additionally, in some embodiments, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-readable (i.e., computer-accessible) medium configured to store program instructions and data as described above for implementing embodiments of the corresponding methods and apparatus (e.g., server-side or customer-side features for time-based credential validity period reduction). In some embodiments, program instructions and/or data may be received, sent or stored upon different types of computer-readable media. In some embodiments, one or more computer-readable media may include non-transitory storage media or memory media such as magnetic or optical media, e.g., disk or DVD/CD coupled to computing device 800 via I/O interface 830. In one embodiment, a non-transitory computer-readable storage medium may also include any volatile or non-volatile media such as RAM (e.g., SDRAM, DDR SDRAM, RDRAM, SRAM, etc.), ROM, etc., that may be included in some embodiments of computing device 800 as system memory 820 or another type of memory. In one embodiment, a computer-readable medium may include transmission media or signals such as electrical, electromagnetic, or digital signals, conveyed via a communication medium such as a network and/or a wireless link, such as may be implemented via network interface 840. The described functionality may be implemented using one or more non-transitory computer-readable storage media storing program instructions that are executed on or across one or more processors. Portions or all of multiple computing devices such as that illustrated in FIG. 8 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods for server-side or customer-side features for time-based credential validity period reduction. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more storage devices to implement a credential management repository to store validity time period information or replacement time information for a plurality of credentials; and
   one or more processors and one or more memories to store computer-executable instructions that, if executed, cause the one or more processors to implement a credential management system to, for respective credential holders of a plurality of credential holders:
   determine to renew a current version of a time-based security credential for the respective credential holder;
   responsive to the determination to renew, determine a validity time period length for a renewed version of the time-based security credential based on:
   a validity time period length for the current version of the time-based security credential, and
   one or more renewal completion metrics for the respective credential holder, wherein the one or more renewal completion metrics measure one or more characteristics of one or more completions of one or more renewals of one or more time-based security credentials;

obtain on behalf of the respective credential holder, from a credential authority, the renewed version of the time-based security credential having the determined validity time period length; and return the renewed version of the time-based security credential to the respective credential holder, wherein receipt of the renewed version of the time-based security credential initiates performance of a credential deployment process at the respective credential holder to update use of the current version of the time-based security credential to the renewed version of the time-based security credential.

2. The system of claim 1, wherein to perform said determine to renew the current version of a time-based security credential, the computer-executable instructions, if executed, further cause the one or more processors to perform said determine to renew, based on receipt of a renewal request from the respective credential holder for a current version of the time-based security credential.

3. The system of claim 1, wherein the renewal completion metrics comprise:

time taken to complete renewal of the credential, percentage of nodes at credential holder successfully completing renewals within a time threshold, number of previous consecutive renewal processes successfully completed within a time threshold, or percentage of previous renewal processes successfully completed within a time threshold.

4. The system of claim 1, wherein:

the credential management system is implemented in a network-based, multi-tenant provider network; and the renewed version of the time-based security credential is for a resource of the network-based, multi-tenant provider network.

5. A method, performed by one or more computing devices, the method comprising:

determining, responsive to a determination to renew a time-based security credential for a credential holder, a validity time period length for a renewed version of the time-based security credential, determining the validity time period length based on:

a validity time period length for a current version of the time-based security credential, and one or more renewal completion metrics for the credential holder, wherein the one or more renewal completion metrics measure one or more characteristics of one or more completions of one or more renewals of one or more time-based security credentials;

obtaining on behalf of the credential holder, from a credential authority, the renewed version of the time-based security credential having the determined validity time period length; and returning the renewed version of the time-based security credential to the credential holder.

6. The method of claim 5, wherein said determining to renew is based on receiving a renewal request, from the respective credential holder, for the current version of the time-based security credential.

7. The method of claim 5, wherein the one or more renewal completion metrics include:

time taken to successfully complete the renewal, percentage of nodes at credential holder that successfully completed renewals within a time threshold, number of previous consecutive renewal processes successfully completed within a time threshold, or percentage of previous renewal processes successfully completed within a time threshold.

8. The method of claim 5, further comprising:

increasing validity time period length relative to a current validity time period length if one or more of the renewal completion metrics fail to meet a specified requirement; or shortening validity time period length relative to current length if one or more of the renewal completion metrics meet a specified requirement.

9. The method of claim 8, further comprising:

wherein, for said increasing the validity time period length, the increase is subject to a maximum time period length, and wherein, for said shortening the validity time period length, the shortening is subject to a minimum time period length.

10. The method of claim 5, further comprising:

monitoring one or more of the renewal completion metrics to determine whether performance of a renewal process at the respective credential holder to update use of the current version of the time-based security credential to the renewed version of the time-based security credential is completed within a threshold time period; and proactively requesting a new renewed time-based security credential from the credential authority having a longer validity time period length than the renewed time-based security credential.

11. The method of claim 10, wherein said proactively requesting the new renewed time-based security credential comprises revoking the renewed time-based security credential.

12. The method of claim 5, further comprising:

receiving a renewal policy from the credential holder specifying one or more criteria for determining validity time period lengths for credential renewal, wherein the determination of the validity time period is further based on the one or more criteria specified in the renewal policy from the respective credential holder.

13. The method of claim 12, wherein the criteria specified in policy includes one or more of:

a requirement for the one or more renewal completion metrics indicating when to shorten length of the validity time period;

a requirement for the one or more renewal completion metrics indicating when to increase length, minimum length, or maximum length for the validity time period;

a requirement for the one or more renewal completion metrics indicating when to proactively initiate a new renewal if a new renewal not complete.

14. The method of claim 5, wherein the time-based security credential is a cryptographical credential, a public key certificate, a TLS or SSL certificate, a code signing certificate, a client or personal ID certificate, or a secure session token.

15. The method of claim 14, further comprising:

transmitting requests to one or more resources or services at the respective credential holder using the time-based security credential to verify completion of a renewal process at the respective credential holder; and updating the renewal completion metrics for the one or more resources or services based on responses to the transmitted requests.

16. One or more non-transitory computer-readable storage media storing program instructions that, when executed on or across one or more processors implement a credential holder process configured to perform:
- sending a renewal policy of a credential holder to a credential management system, wherein the renewal policy specifies criteria for determining a validity time period length for a renewed version of a time-based security credential;
- receiving a renewed version of the time-based security credential from the credential management system;
- performing, based on receipt of the renewed version of the time-based security credential, a renewal process to update use of a current version of the time-based security credential at one or more resources to the renewed version of the time-based security credential; and
- reporting one or more renewal completion metrics for the renewal process to the credential management system, wherein the one or more renewal completion metrics measure one or more characteristics of one or more completions of one or more renewals of one or more time-based security credentials.

17. The one or more non-transitory computer-readable storage media of claim 16, further comprising program instructions that, when executed on or across one or more processors perform:
- determining when to renew; and
- sending a renewal request to the credential management system.

18. The one or more non-transitory computer-readable storage media of claim 16,
- wherein one or more of the credentials are digital certificates; and
- further comprising program instructions that, when executed on or across one or more processors perform:
  - determining when to renew for different subsets of resources using different digital certificates, the different digital certificates having different time periods; and
  - sending a respective renewal request for each subset to the credential management system.

19. The one or more non-transitory computer-readable storage media of claim 16, wherein the renewal policy sent to the credential management system includes one or more of:
- a requirement for the one or more renewal completion indicating when to shorten length;
- a requirement for the one or more renewal completion indicating when to increase length, minimum length, or maximum length;
- a requirement for the one or more renewal completion indicating when to proactively initiate a new renewal if a new renewal is not complete.

20. The one or more non-transitory computer-readable storage media of claim 16, wherein said reporting one or more renewal completion metrics for the renewal process to the credential management system comprises reporting:
- time taken to successfully complete the renewal,
- percentage of nodes at credential holder that successfully completed renewals within a time threshold,
- number of previous consecutive renewal processes successfully completed within a time threshold, or
- percentage of previous renewal processes successfully completed within a time threshold.

* * * * *